(12) United States Patent
Sharratt et al.

(10) Patent No.: US 10,508,422 B2
(45) Date of Patent: Dec. 17, 2019

(54) SHUTOFF SYSTEM FOR WATER VALVE

(71) Applicant: WAXMAN CONSUMER PRODUCTS GROUP INC., Bedford Heights, OH (US)

(72) Inventors: Jason Sharratt, Wadsworth, OH (US); Tianzhe Wang, Shaker Heights, OH (US); Martin Marsic, Highland Heights, OH (US)

(73) Assignee: Waxman Consumer Products Group Inc., Bedford Heights, OH (US)

( * ) Notice: Subject to any disclaimer, the term of this patent is extended or adjusted under 35 U.S.C. 154(b) by 0 days.

(21) Appl. No.: 15/776,607

(22) PCT Filed: Dec. 14, 2016

(86) PCT No.: PCT/US2016/066548
§ 371 (c)(1),
(2) Date: May 16, 2018

(87) PCT Pub. No.: WO2017/112480
PCT Pub. Date: Jun. 29, 2017

(65) Prior Publication Data
US 2018/0334786 A1 Nov. 22, 2018

Related U.S. Application Data

(60) Provisional application No. 62/270,673, filed on Dec. 22, 2015, provisional application No. 62/338,009, filed on May 18, 2016.

(51) Int. Cl.
*E03B 7/07* (2006.01)
*F16K 31/05* (2006.01)
*F16K 51/00* (2006.01)

(52) U.S. Cl.
CPC .............. *E03B 7/071* (2013.01); *F16K 31/05* (2013.01); *F16K 31/055* (2013.01); *F16K 51/00* (2013.01)

(58) Field of Classification Search
CPC ......... E03B 7/071; F16K 31/055; F16K 31/05
See application file for complete search history.

(56) References Cited

U.S. PATENT DOCUMENTS

| 4,488,567 | A | 12/1984 | Grant |
| 5,131,623 | A | 7/1992 | Giordani |
| (Continued) | | | |

FOREIGN PATENT DOCUMENTS

FR 2797023 2/2001

OTHER PUBLICATIONS

International Search Report and Written Opinion, dated Apr. 12, 2017, in connection with PCT/US2016/066548, filed Dec. 14, 2016.

*Primary Examiner* — Kevin L Lee
(74) *Attorney, Agent, or Firm* — Fay Sharpe LLP

(57) ABSTRACT

An automatic valve actuator unit and method for use with an associated manual shutoff valve configured to permit or restrict the flow of fluid through an associated supply pipe. The unit comprises a housing, an attachment mechanism for securing the housing to at least one of the associated supply pipe or manual shutoff valve, and an actuator at least partially supported in the housing and having an output shaft extending from the housing. The output shaft includes a locating member supported at a distal end thereof for non-rotatingly engaging a surface of a valve handle of the associated manual shutoff valve adjacent a point of attachment of the handle to the associated manual shutoff valve, the locating member configured to center the output shaft over an axis of rotation of the handle of the associated manual shutoff valve.

17 Claims, 12 Drawing Sheets

(56) References Cited

U.S. PATENT DOCUMENTS

| | | |
|---|---|---|
| 5,240,022 A | 8/1993 | Franklin |
| 5,409,037 A | 4/1995 | Wheeler et al. |
| 5,588,637 A | 12/1996 | Carsten et al. |
| 5,794,653 A | 8/1998 | DeSmet et al. |
| 5,967,171 A | 10/1999 | Dwyer, Jr. |
| 6,003,536 A | 12/1999 | Polverari et al. |
| 6,065,735 A | 5/2000 | Clark |
| 6,105,607 A | 8/2000 | Caise et al. |
| 6,170,509 B1 | 1/2001 | Karta |
| 6,206,337 B1 | 3/2001 | Veillet, Jr. |
| 6,283,139 B1 | 9/2001 | Symonds et al. |
| 6,293,515 B1 | 9/2001 | Clark |
| 6,369,714 B2 | 4/2002 | Walter |
| 6,491,062 B1 | 12/2002 | Croft |
| 6,530,557 B1 | 3/2003 | Guzorek |
| 6,662,821 B2 | 12/2003 | Jacobsen et al. |
| 6,913,034 B2 | 7/2005 | Szafron |
| 6,945,274 B1 | 9/2005 | Davis |
| 7,044,154 B2 | 5/2006 | Henderson et al. |
| 7,066,192 B1 | 6/2006 | Delaney et al. |
| 7,549,435 B2 | 6/2009 | Walter |
| 7,641,172 B2 | 1/2010 | Richards et al. |
| 7,900,650 B1 | 3/2011 | Wilson |
| 8,256,742 B2 | 9/2012 | Staffiere et al. |
| 8,857,466 B1 | 10/2014 | Wilson |
| 8,931,513 B1 | 1/2015 | Holley et al. |
| 8,931,755 B2 | 1/2015 | Staffiere et al. |
| 9,016,662 B2 | 4/2015 | Staffiere et al. |
| 9,127,443 B1 | 9/2015 | Raffaldt |
| 9,139,986 B2 | 9/2015 | Smith et al. |
| 2007/0289635 A1 | 12/2007 | Ghazarian et al. |
| 2012/0132838 A1* | 5/2012 | Staffiere et al. ...... F16K 31/055 251/129.01 |
| 2014/0001383 A1 | 1/2014 | Staffiere et al. |
| 2014/0224353 A1* | 8/2014 | Strebe ................... F16K 31/043 137/343 |
| 2014/0264111 A1* | 9/2014 | Porter et al. ............ F16K 17/36 251/129.03 |

* cited by examiner

SHUTOFF SYSTEM FOR WATER VALVE

CROSS REFERENCE TO RELATED PATENTS AND APPLICATIONS

This application claims priority to and the benefit of the filing date of International Application No. PCT/US2016/066548, filed Dec. 14, 2016, which application claims priority to and the benefit of the filing date of U.S. Provisional Patent Application Ser. No. 62/270,673, filed Dec. 22, 2015, and U.S. Provisional Patent Application Ser. No. 62/338,009, filed May 18, 2016, which applications are hereby incorporated by reference.

BACKGROUND

Water for use in buildings or other structures is typically provided through a water line which supplies water to the building from a water source, such as a municipal water provider or well, for example. In a typical installation, water enters the building via a main or primary supply line and then branches out within the building via secondary lines to various fixtures (e.g., faucets, toilets, spigots, etc.) and/or appliances (e.g., clothes or dish washing machines, ice makers, water heaters, etc.). A shutoff valve is typically provided to shutoff flow from the water source to the structure. Such shutoff valves are often ball or gate valves that can be manually actuated when water flow is to be shutoff.

Automated water shutoff systems have been developed to automatically close the shutoff valve in the event of a leak or flooding condition. Such systems generally include an automated valve and one or more sensors positionable in various locations to monitor and detect the presence of water. For example, a sensor may be placed near a water heater to monitor the space around the water heater for leaks. When water is detected, the sensor triggers the automated valve to close.

Such systems generally require one or more professionals for installation. For example, a plumber may be needed to replace an existing manual shutoff valve with an automated valve. Thus, typical systems have not traditionally been considered suitable for do-it-yourself installation by, for example, a typical homeowner.

Attempts have been made to retrofit existing manual shutoff valves with an actuator to thereby convert a manual valve to an automatic valve. Such attempts, however, have generally had limited application for various reasons. For example, a wide range of shutoff valve types and installation configurations make it difficult to develop a one-size-fits-all actuator. Previous actuators have required the installer to precisely position the actuator relative to the shutoff valve to ensure proper operation. This can be difficult for do-it-yourself consumers depending on the particular existing shutoff valve arrangement. Thus, installation of such prior art actuators still is not a task within the skills of a typical do-it-yourself consumer.

SUMMARY

The present disclosure sets forth a system and method for automatically closing (and/or opening) a manual water shutoff valve in response to a detected condition (e.g., water leak, temperature, no occupancy, etc.) The system includes an automatic water valve shutoff unit mountable to an existing shutoff valve. The unit includes a mounting structure that is easily adaptable to a variety of valve sizes and configurations. Various sensors are operably coupled to the shutoff unit. When a prescribed condition is sensed by one or more of the sensors, the shutoff unit is activated to close the manual shutoff valve.

In accordance with one aspect, an automatic valve actuator unit for use with an associated manual shutoff valve configured to permit or restrict the flow of fluid through an associated supply pipe is set forth. The unit comprises a housing, an attachment mechanism for securing the housing to at least one of the associated supply pipe or manual shutoff valve, and an actuator at least partially supported in the housing and having an output shaft extending from the housing. The output shaft includes a locating member supported at a distal end thereof for non-rotatingly engaging a surface of a valve handle of the associated manual shutoff valve adjacent a point of attachment of the handle to the associated manual shutoff valve, the locating member configured to center the output shaft over an axis of rotation of the handle of the associated manual shutoff valve.

The unit can further include a handle engaging member fixed to the output shaft for rotation therewith, the handle engaging member having a u-shape cross-section for engaging opposite sides of the handle of the associated manual shutoff valve. The handle engaging member can extend radially from the output shaft and can be configured to engage the handle of the associated manual shutoff valve at a location spaced from the axis of rotation of the handle. The attachment mechanism can include a clamp assembly having first and second cooperating clamp members, the first and second cooperating clamp members being movable within the housing to adjust a point of attachment of the housing. The first clamp member can include a clamp block supported for sliding movement within the housing between an upper and lower position, and the second clamp member can include a removable u-shape clamp. The unit can further include an adjustment member for adjusting the position of the clamp block within the housing, the adjustment member operative to move the clamp block between the upper and the lower positions. The adjustment member can include a lead screw including a threaded shaft with a non-circular cross-sectional portion, and a handle member including a tubular portion telescoped over the threaded shaft, the tubular portion including a non-circular portion cross-sectional portion corresponding in shape to the non-circular cross-sectional portion of the shaft, the handle member being slidable axially along the threaded shaft between a first position whereat the non-circular cross-sections are not axially aligned and the threaded shaft and handle member are not rotationally interlocked, to a second position whereat the non-circular cross-sections are at least partially aligned thereby rotationally interlocking the handle member and the threaded shaft for actuation of the lead screw.

The unit can further include a quick-release member movable between a locked and unlocked position for permitting or restricting withdrawal of the u-shape clamp from the housing. The locating member can include a cavity for telescopically receiving a handle nut of the associated manual shutoff valve. The cavity can be cylindrical, and a peripheral end wall of the locating member can be configured to abut the handle of the associated manual shutoff valve. The actuator can include a battery-powered electric motor operably connected to the output shaft via a gear train, the battery-powered electric motor being supported by the housing at a position between the attachment mechanism and the output shaft.

In accordance with another aspect, a system comprises at least one sensor configured to detect the present of water and the automatic valve actuator unit as set forth herein. The sensor is configured to transmit a signal to the automatic valve actuator unit to close the associated manual shutoff valve when water is detected.

In accordance with another aspect, a method of converting a manual shutoff valve to an automatic shutoff valve comprises providing an automatic valve actuator unit comprising a housing, an attachment mechanism for securing the housing to the manual shutoff valve or adjacent structure, and an actuator at least partially supported in the housing and having an output shaft extending from the housing, the output shaft including a locating member supported at a distal end thereof and a valve handle engaging member, positioning the automatic valve actuator unit over the manual shutoff valve, centering the automatic valve actuator unit by telescoping the locating member over a handle fastener of the manual shutoff valve such that the output shaft is aligned with a rotational axis of the manual shutoff valve, securing the automatic valve actuator unit to the manual shutoff valve or adjacent structure with the attachment mechanism, and coupling the valve handle engaging member to a handle of the manual shutoff valve.

The attachment mechanism can include a clamp assembly having first and second cooperating clamp members, the first and second cooperating clamp members being movable within the housing to adjust a point of attachment of the housing, and wherein the securing includes leveling the automatic valve actuator unit by moving at least one of the clamp members within the housing. The securing can further include positioning the first clamp member on a first side of the manual shutoff valve or adjacent structure, inserting the second clamp member into the housing such that the manual valve member or other adjacent structure is trapped between the first and second clamp members, and clamping the manual shutoff valve or other adjacent structure therebetween by drawing the first and second clamp members together with an adjustment member. The second clamp member can be releasably secured in the housing by a quick-release member movable between a first position permitting insertion of the second clamp member into the housing and restricting withdrawal of the second clamp member from the housing, and a second position permitting insertion and withdrawal of the second clamp member from the housing.

In accordance with another aspect, an automatic valve actuator unit for use with an associated manual shutoff valve configured to permit or restrict the flow of fluid through an associated supply pipe comprises a housing, an actuator at least partially supported in the housing and having an output shaft extending from the housing, means for locating the output shaft over an axis of rotation of the handle of the associated manual shutoff valve, and means for securing the housing to at least one of the associated supply pipe or manual shutoff valve.

DETAILED DESCRIPTION

Figure 1:
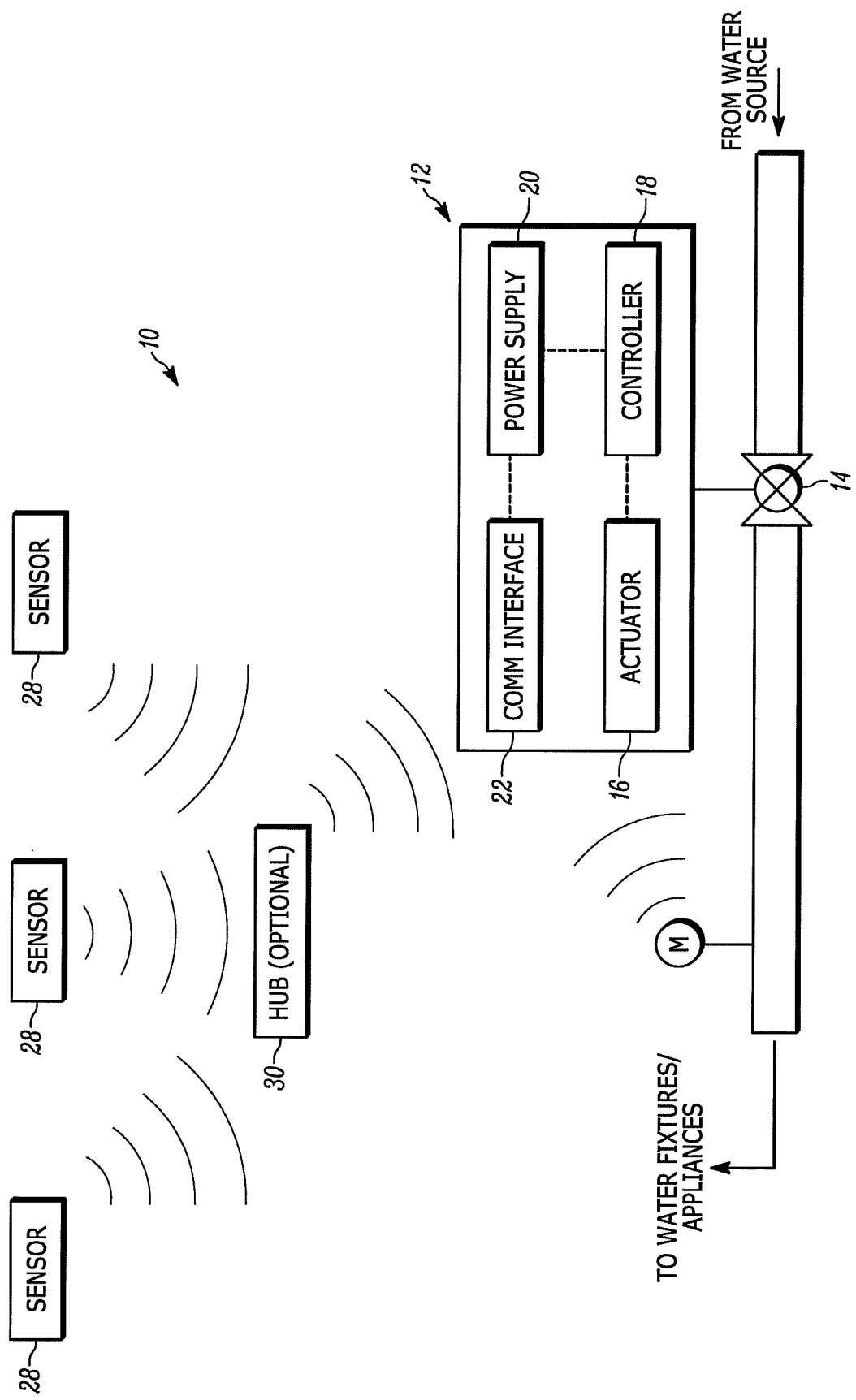
FIG. 1 is a schematic diagram of an exemplary system in accordance with the present disclosure.

The following description of exemplary embodiment(s) is merely illustrative in nature and is in no way intended to limit the invention, its application, or uses. Exemplary embodiments can be incorporated into various water supply systems (e.g., residential, commercial, industrial, etc.). Similar reference numerals and letters refer to similar components in the following figures. Once a component is described in one figure, it may not be discussed or further described in the following figures.

FIG. 1 illustrates an exemplary automatic water leak detection and shutoff system in accordance with the present disclosure and identified generally by the reference numeral 10. The system 10 generally includes an automatic valve actuator in the form of a water valve shutoff unit 12 operatively connected to a shutoff valve 14 of an existing plumbing system, such as in a residence, building or other structure. It will be appreciated that the shutoff valve 14 can be any suitable shutoff valve such as a ball valve or a gate valve that is typically open and closed by rotating a knob or lever. The shutoff valve 14 in the illustrated embodiment permits or restricts flow from a water source such as a municipal water supply, a well, or other source to the downstream water fixtures and/or appliances within the structure. A meter M can be included for measuring the flow of water. The meter M can be configured to communicate with the water valve shutoff unit 12.

The water valve shutoff unit 12 of the illustrated embodiment includes an actuator 16 that, as will be described in more detail below, is operatively connected to the handle or lever of the shutoff valve 14 and is configured to rotate the handle or lever to move or cycle the valve between opened and closed positions. The water shutoff valve unit 12 further includes a controller 18, a power supply 20 and a communication interface 22. The controller 18 can include any suitable controller, microprocessor, or the like. The power supply 20 can include an AC power supply connected to an outlet of a home, or a DC power supply such as a battery, for example. The communication interface 22 can include any suitable wired or wireless communication interface (e.g., wifi, Bluetooth, NFC, Ethernet, etc.) As will be described in more detail below, the controller 18 is configured to send a signal to the actuator 16 to close and/or open the valve in response to data received by the communication interface 22 from one or more water sensors 28.

Water sensors 28 are configured to sense the presence of a predetermined condition, such as water, in one or more locations and transmit a signal indicative of sensed water to the water valve shutoff unit 12. It will be appreciated that any suitable wireless communication protocol can be used to transmit data between the sensors 28 and the communication interface 22. In some embodiments, an optional hub 30 is provided through which the sensors 28 are configured to communicate with the water valve shutoff unit 12. The optional hub 30 can be an existing home automation hub, for example, or any other intermediary device suitable for communicating with both the sensors 28 and the water valve shutoff unit 12. While three sensors 28 are illustrated in FIG. 1, it will be appreciated that virtually any number of sensors can be provided as needed depending on a particular application. In a typical residential installation, sensors would be placed near water consuming appliances such as refrigerators, water heaters, etc. as well as any plumbing fixtures within the home such as toilets, sinks, bathtubs, showers, etc. In addition, sensors may typically be placed in basement locations near sump pump pits, condensation drains, etc.

Each of the sensors may typically include sensor circuitry designed to detect the presence of water as well as a power source such as one or more batteries, for example. It should be appreciated that a wide range of sensors can be used in accordance with the present disclosure and that such sensors can be configured to communicate either directly with the water valve shutoff unit 12 or indirectly via a hub (e.g., hub 30), which may be a home automation unit that is configured to monitor a wide range of household activity, in addition to the sensors, such as lighting, home entertainment systems, security systems, etc.

In operation, the system 10 monitors for the presence of water at sensors 28. When water is detected by one or more of the sensors 28, a signal is sent to the water valve shutoff unit 12. The signal is received by the communication interface 22, which then communicates the signal to the controller 18. Controller 18, in response to receiving the signal, generates and transmits a "valve close" signal to the actuator 16 to close the shutoff valve 14. Actuator 16 is then energized to close the shutoff valve 14. In other instances, such as when a sensor detects a water from a source other than the building water supply (e.g., rain, sump pump overflow, etc.), the controller can instead (or additionally) generate an alert or sound an alarm.

In a typical installation, once the water valve shutoff unit 12 receives and processes the signal from a sensor and closes the shutoff valve 14, the shutoff valve 14 is maintained in the closed position until manually reopened by the consumer or a technician. This helps to ensure that the condition leading to the sensor sending the signal to the shutoff unit 12 is investigated and rectified prior to the shutoff valve being reopened. In other configurations, the water valve shutoff unit 12 can be configured to open the shutoff valve 14 by energizing the actuator 16 in a reverse manner. To this end, a "reset" or "reopen" button (not shown) can be provided on the unit 12.

Figure 2:
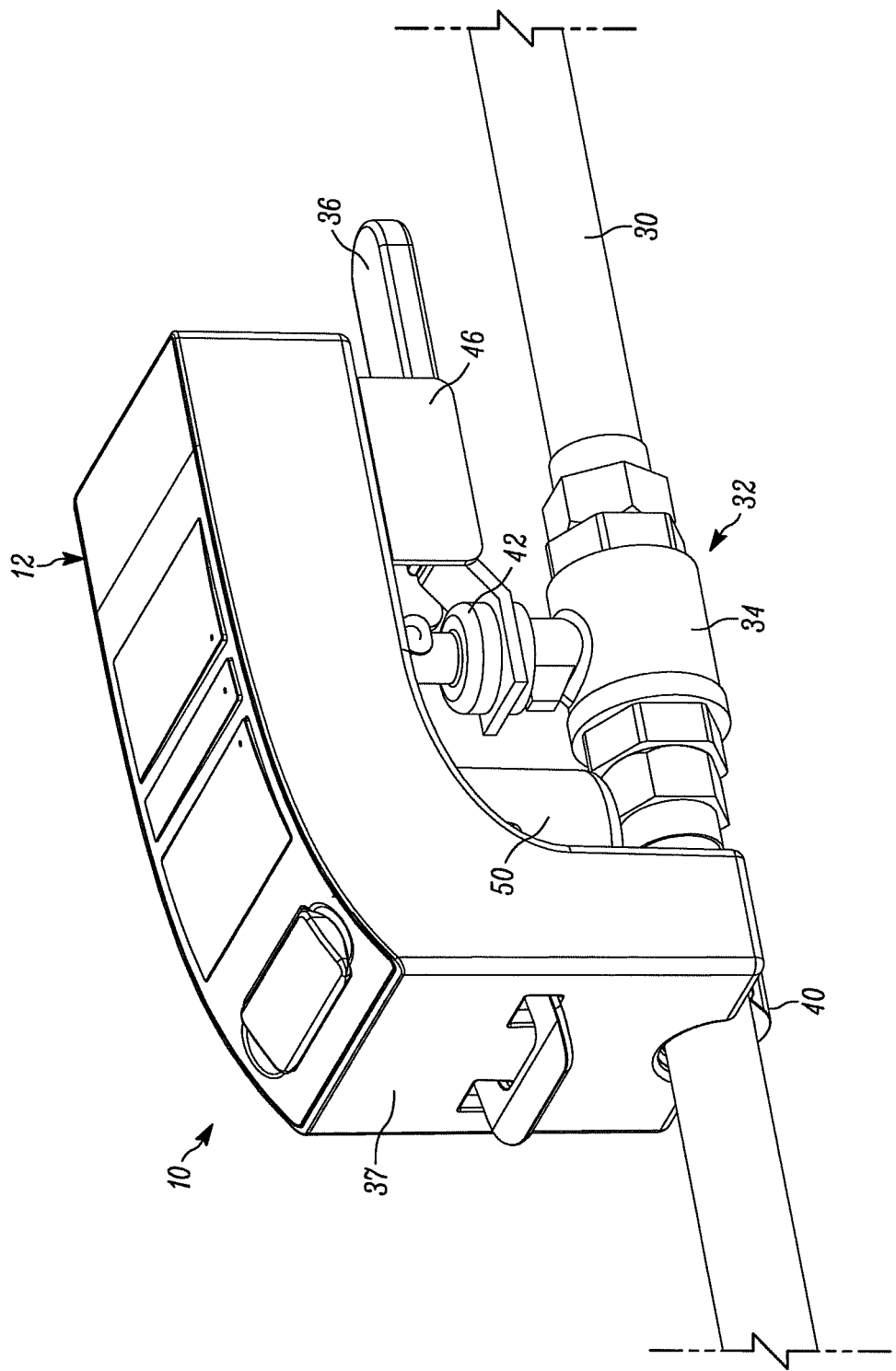
FIG. 2 is a perspective view of an exemplary water valve shutoff unit mounted to a water pipe adjacent a shutoff valve in accordance with the present disclosure.
Figure 3:
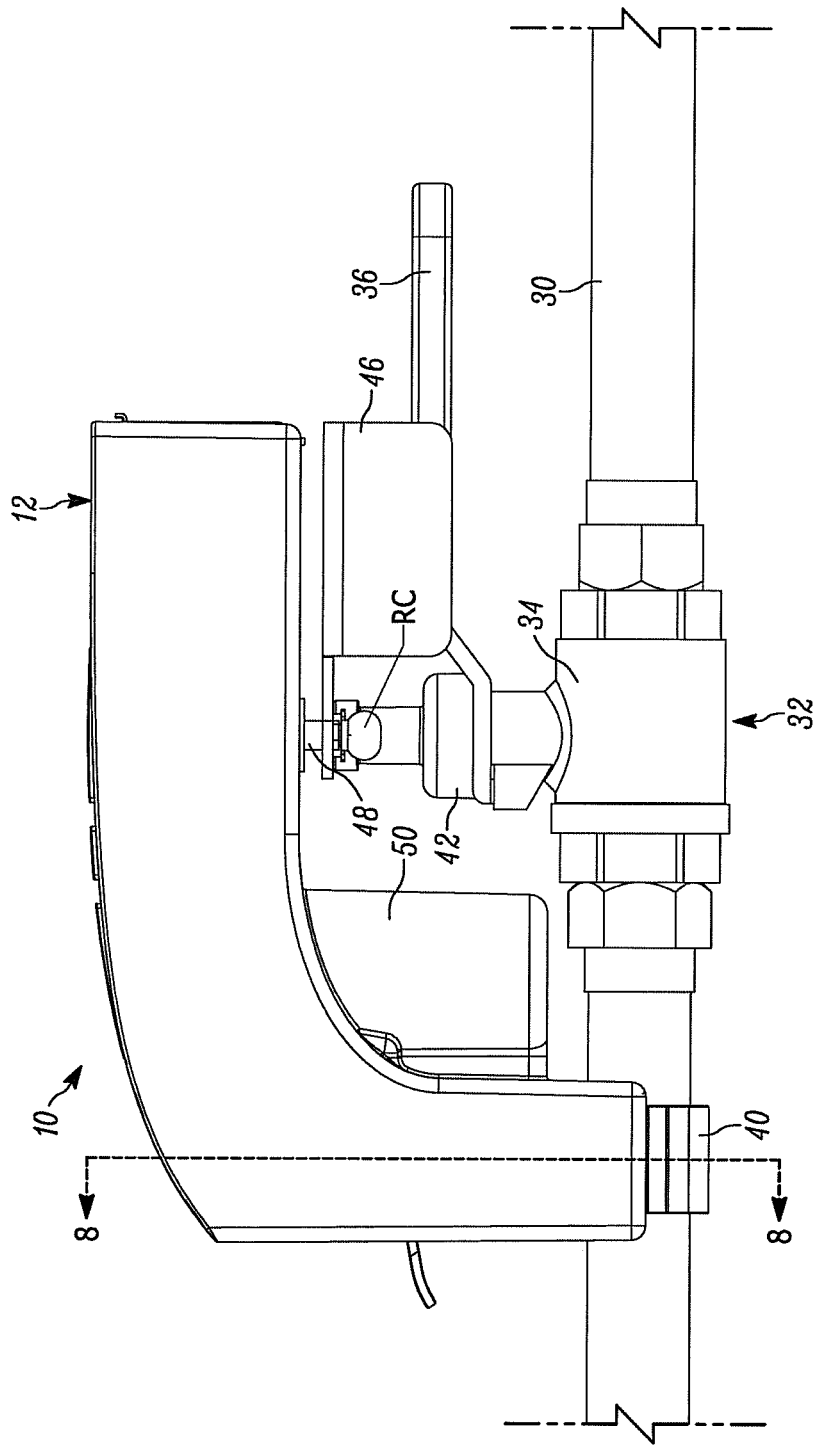
FIG. 3 is a first side elevational view of the exemplary water valve shutoff unit of FIG. 2.
Figure 4:
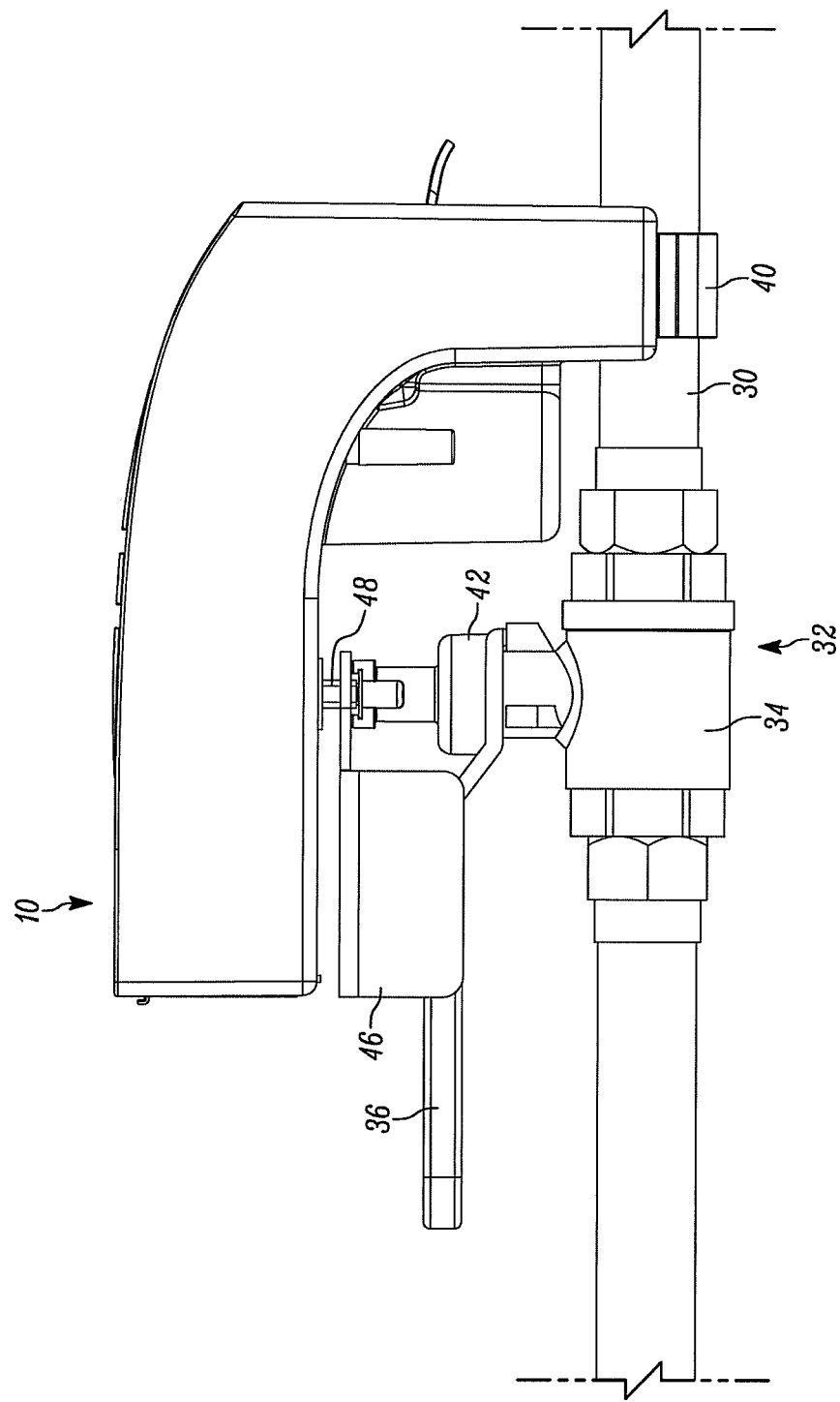
FIG. 4 is a second side elevational view of the exemplary water valve shutoff unit of FIG. 2.

Turning to FIGS. 2-8, an exemplary water valve shutoff unit 12 is illustrated mounted on a main water pipe 30 adjacent a shutoff valve 32. It will be appreciated that the water valve shutoff unit 12 is operatively connected to the shutoff valve 32, which is configured to permit or restrict flow through the inlet pipe 30. In the illustrated embodiment, the shutoff valve 32 is a ball valve that includes a valve body 34 and a handle 36 for moving the ball between open and closed positions. As shown in FIG. 2, the shutoff valve 32 is in the open position (with the handle 36 pointing parallel along the pipe 30 towards the downstream direction). Aspects of the present disclosure are applicable to other types of valves and valve configurations, such as gate valves, for example.

The water valve shutoff unit 12 generally includes a housing 37 which can be made of plastic, metal or other suitable materials. The housing 37 supports, among other things, an attachment mechanism 40 for securing the housing 12 to the pipe 30. As will be described in more detail below, the attachment mechanism engages the pipe 30 and is adjustable to accommodate various valve types and configurations. In the illustrated embodiment, the water valve shutoff unit 12 is supported on pipe 30 at a position upstream of shutoff valve 32 by attachment mechanism 40. Of course, other installations or valve configurations may necessitate mounting the water valve shutoff unit 12 in other positions.

The water valve shutoff unit 12 is further supported by a locating member 42 extending from the housing 37. As will be described below, locating member 42 abuts an upper surface of valve handle 36 and is telescoped over, but not rotationally engaged with, valve nut 44 securing the valve handle 36 to the valve body 34. A handle engagement member 46 surrounds each side of the handle 36 for moving the handle 36 ninety (90) degrees between the open and closed position. The handle engagement member can be a multi-piece structure.

The locating member 42 and handle engagement member 46 are each removably coupled to an output shaft 48 which transmits torque from an actuator 50 to effect rotation of the valve handle 36 engaging member 46 in clockwise and/or counterclockwise directions. In the illustrated embodiment, the output shaft 48, locating member 42 and the handle engagement member 46 are keyed together for rotation by corresponding non-circular cross-sectional portions thereof. A retainer clip RC has an opening 47 (see FIG. 5) through which the output shaft 48 can pass. The retainer clip RC is slidable between a locked position and an unlocked position for securing/releasing the locating member 42 and handle engagement member 46 to/from the output shaft 48. In the locked position, the edges of the opening 47 of retainer clip RC engage in a slot SL (see FIG. 7) of the output shaft 48 to restrict axial movement of the locating member 42 and handle engagement member 46 relative to the output shaft 42.

Figure 5:
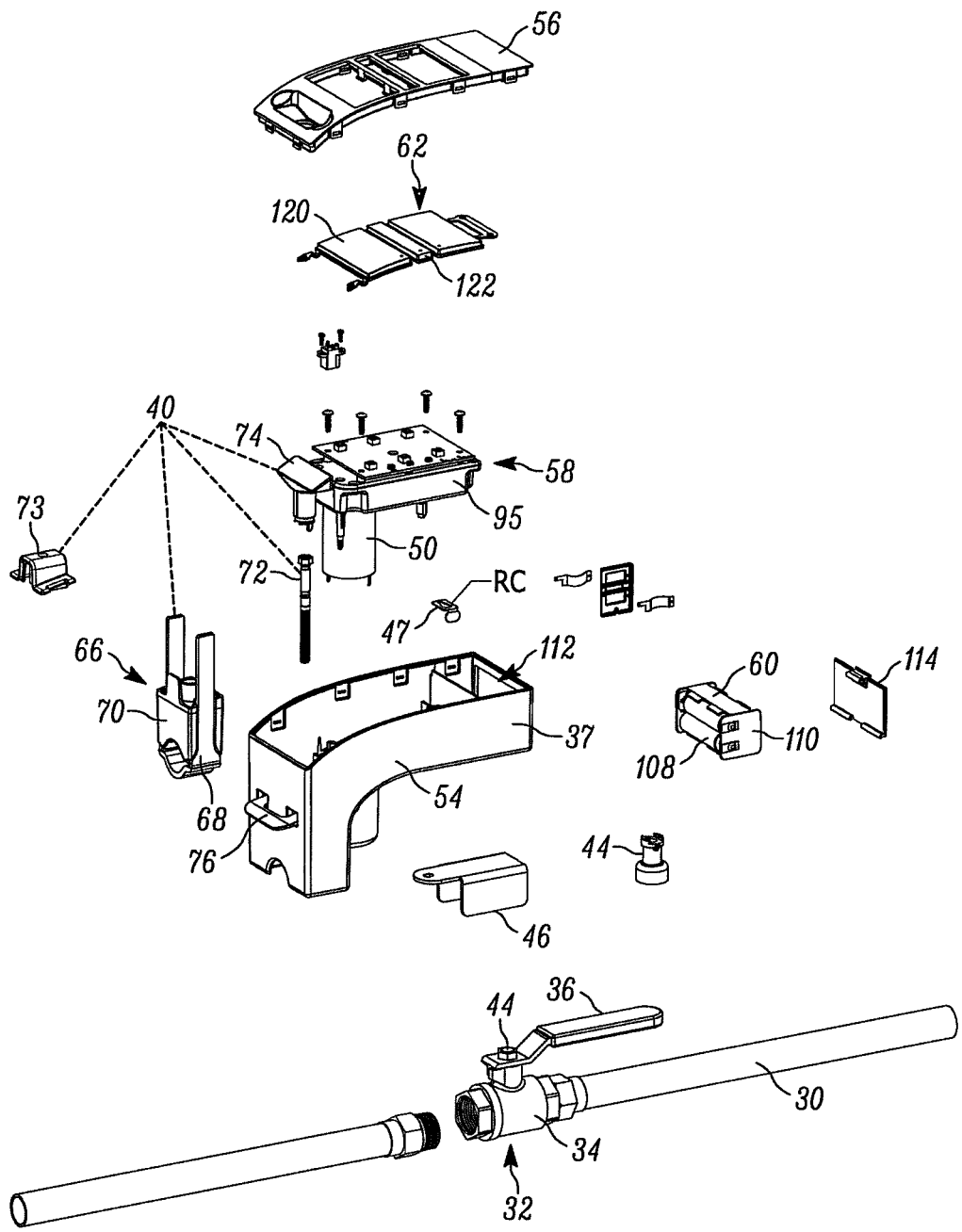
FIG. 5 is an exploded view of the exemplary water valve shutoff unit of FIG. 2.
Figure 6:
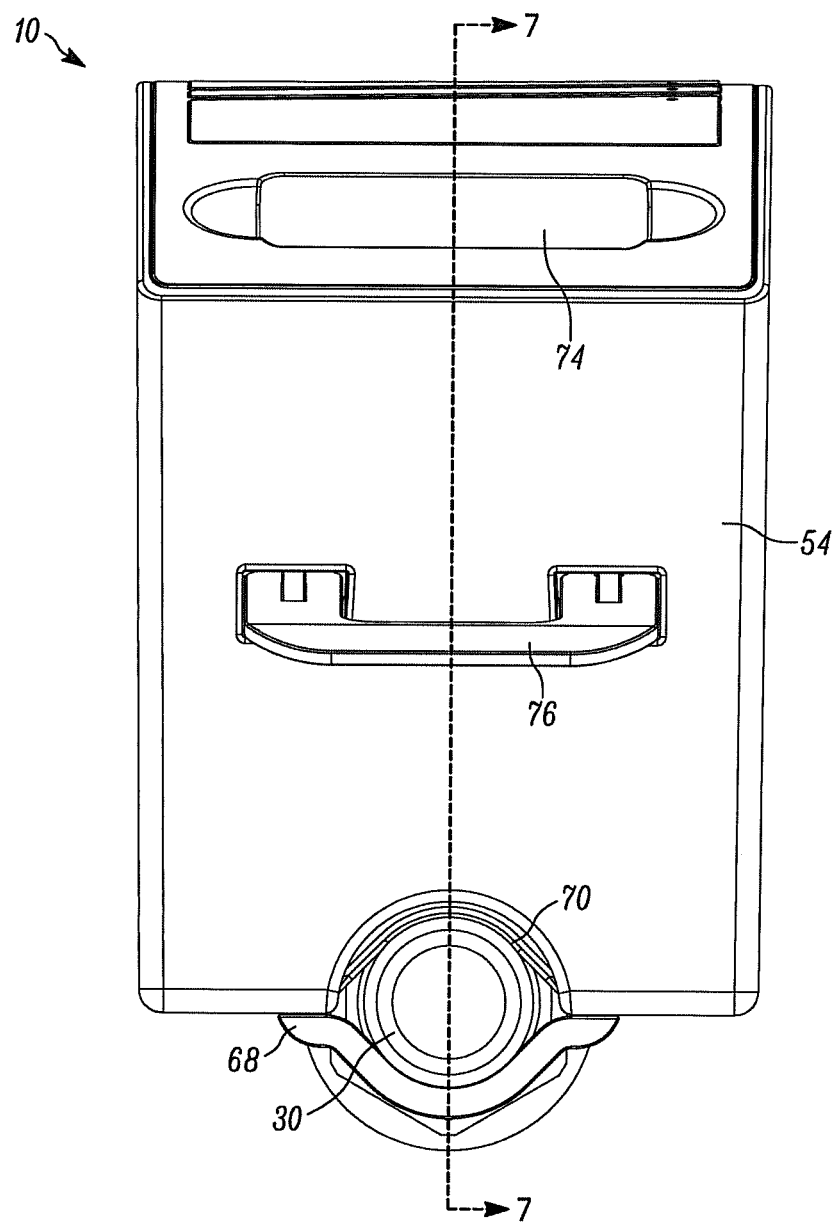
FIG. 6 is an end view of the exemplary water valve shutoff unit of FIG. 2.

Referring now to FIG. 5, which is an exploded view of the water valve shutoff unit 12, the main components of the device will be described. The housing 37 generally includes a base housing portion 54 having a component cavity, and a cover housing portion 56 for enclosing the component cavity. The following components are fully or partially supported within the component cavity: the attachment mechanism 40, a drive unit 58 including the actuator 50, a power supply 60 for supplying power to the drive unit 58, and a user interface 62 for displaying information to a user and/or receiving input from the user. Each of these components will now be described in more detail.

Attachment Mechanism

The attachment mechanism 40 is configured to secure the water valve shutoff unit 12 to pipe 30 or other structure by clamping around the pipe 30 (or other structure). In addition, the attachment mechanism 40 is configured to be adjustable to change a vertical position of securement to the pipe 30 (or other structure) to allow installation and use of the water valve shutoff unit 12 with a wide variety of valves.

Accordingly, the attachment mechanism 40 generally includes a clamp assembly 66. Clamp assembly 66 includes first and second clamp members configured to surround and securely engage opposing portions of the pipe 30. In the illustrated embodiment, the first clamp member is a generally u-shape bar 68 and the second clamp member is a block member 70 slidingly received between respective arms of the u-shape bar 68. Each of the clamp members includes a concave surface adapted to engage a respective opposing portion of the pipe 30. The concave surface can have a v-shape profile, a compound shape profile, or can be generally rounded, depending on the application.

Clamp assembly 66 is slidingly received in an opening in a bottom of the base housing portion 54. A bolt 72 is rotationally supported in housing portion 54 and fixed against axial movement relative to the housing portion 54 by one or more retainers (e.g., snap rings, washers or the like). The bolt 72 is threadedly engaged with a nut/translating member 73 that is fixed against rotation relative to housing portion 54. The bolt 72 and nut/translating member 73 act as a lead screw for converting rotational motion of the bolt 72 to linear motion of the nut/translating member 73. Accordingly, bolt 72 can be rotated in a first direction (e.g., clockwise) by rotating a handle 74 to thereby advance nut/translating member 73 and, consequently block member 70, downwardly to compressively engage pipe 30. Opposite rotation of the handle 74 permits disengagement of block member 70 and/or u-shape bar 68 from pipe 30.

Figure 8:
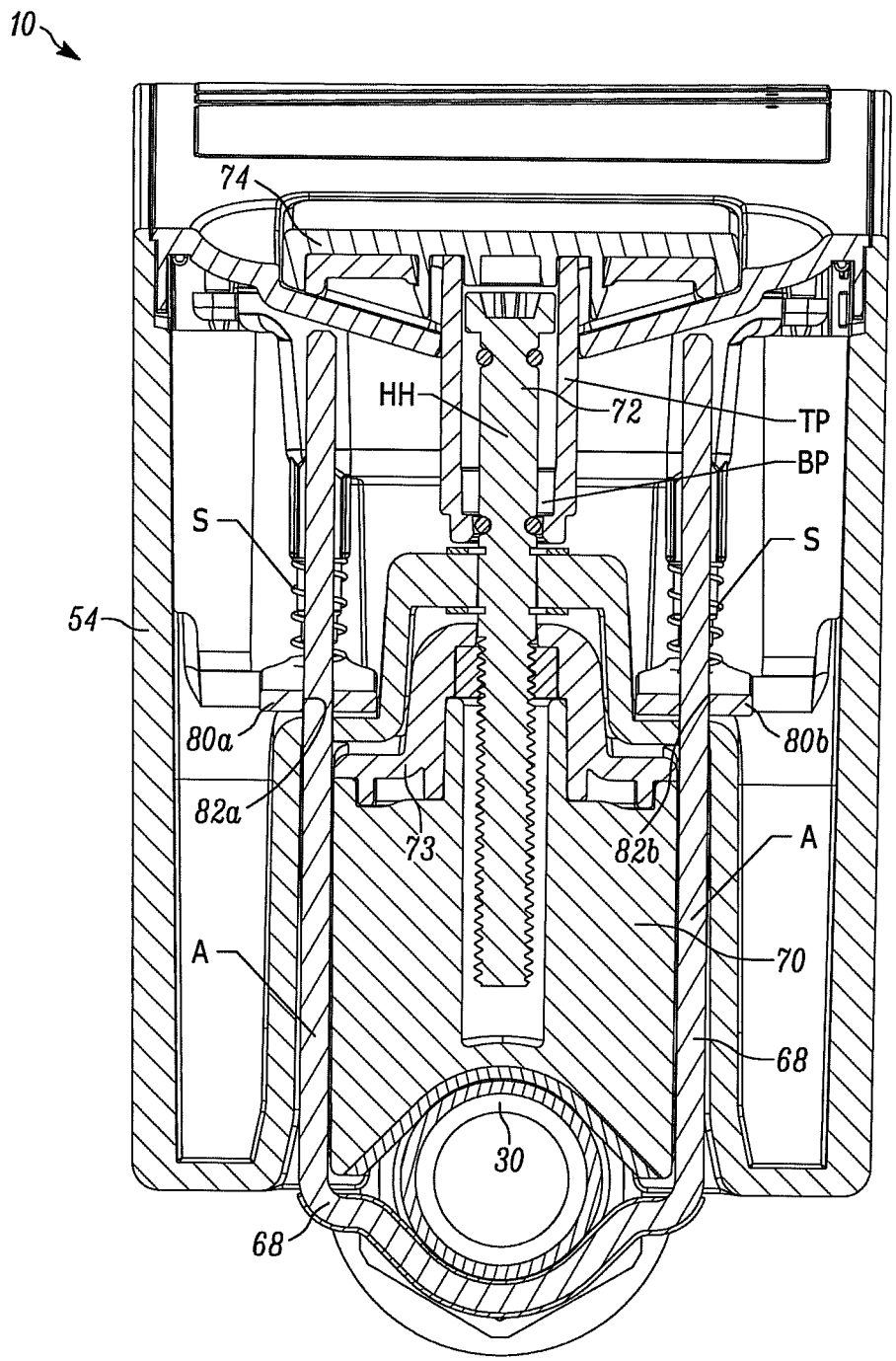
FIG. 8 is a cross-sectional view of the exemplary water valve shutoff unit taken along the line 8-8 in FIG. 3.
Figure 9A:
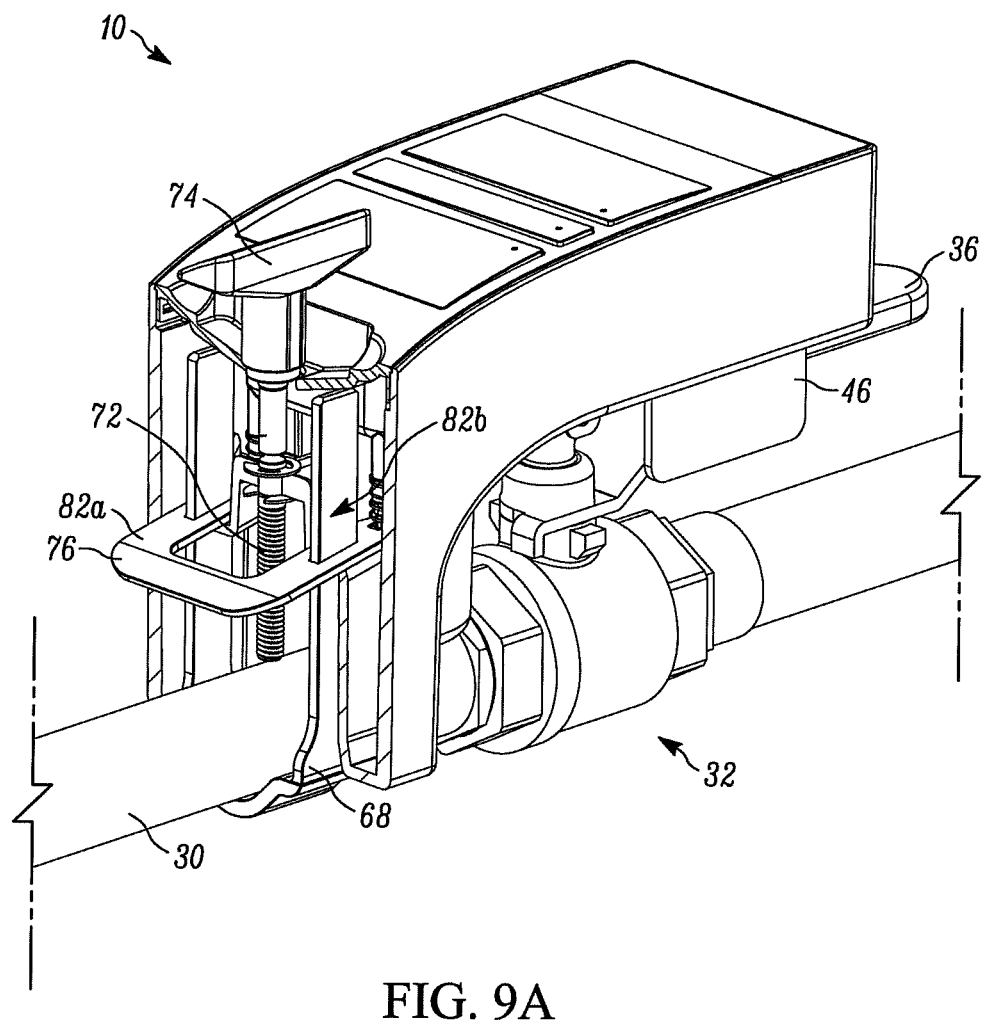
FIG. 9A is a partial cut-away perspective view of the exemplary water valve shutoff unit with the release handle in a first position.
Figure 9B:
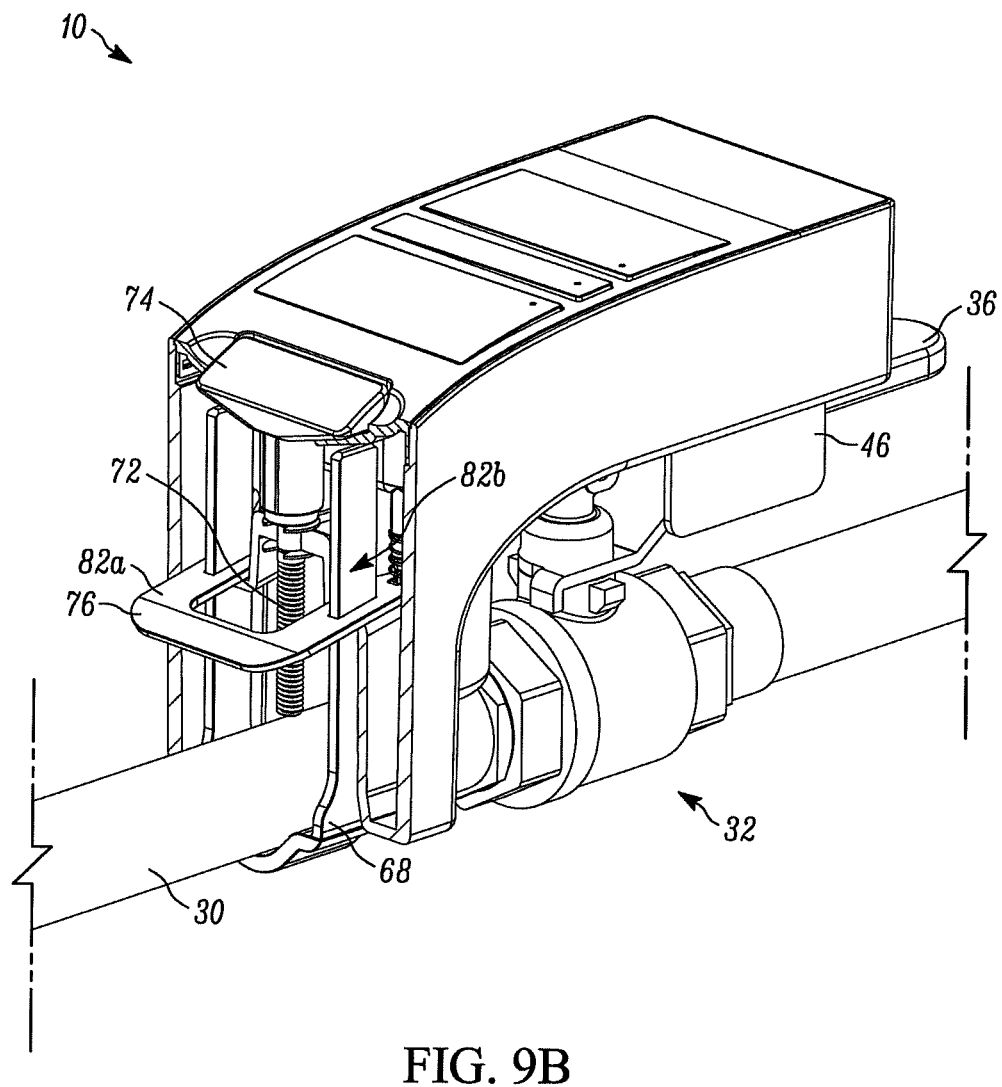
FIG. 9B is a partial cut-away perspective view of the exemplary water valve shutoff unit with the release handle in a second position.

As best shown in FIGS. 8 and 9, the handle 74 includes a tubular portion TP telescoped over the bolt 72. A base portion BP of the tubular portion TP includes a non-circular cross-section adapted to engage with a corresponding non-circular cross-sectional portion of the bolt 72 when axially aligned therewith for rotationally coupling the handle 74 and bolt 72. In this regard, the handle 74 is slidable axially along the bolt 72 from a first position recessed in the housing 37 to a second, raised position whereat the handle 74 extends above the housing 37 for manual operation. In the second position, the base portion BP of the handle is axially aligned with the non-circular cross-sectional portion of the bolt 72, which in the illustrated embodiment is a hex head HH of the bolt 72. As will be appreciated, in the second position the handle 74 is rotationally coupled to the bolt and can be readily turned by a user for installing/adjusting/removing the water valve shutoff unit 12 in the manner described herein.

Vertical positioning of the clamp assembly 66 within the housing 37 and, consequently, the relative location of attachment of the water valve shutoff unit 12 to the pipe 30, is achieved by rotating bolt 72 to position nut/translating member 73 and block member 70 at a desired vertical position within the housing 37, and then sliding the u-shape bar 68 up into the housing 37 to trap the pipe 30 therebetween. To this end, u-shape bar 68 is retained within housing 37 by a quick-release member 76.

With further reference to FIG. 8, quick-release member 76 includes a handle portion 78 extending from the housing 37 and a pair of slotted arms 80a and 80b having slots 82a and 82b through which respective arms A of the u-shape bar 68 extend when inserted into the housing 37. Quick-release member 76 is supported in the housing 37 for pivoting movement between a locked position and a release position. In the locked position, the quick-release member 76 restricts withdrawal of the u-shape bar 68 from the housing 37, while permitting insertion of the u-shape bar 68 into the housing 37. That is, the u-shape bar 68 is restricted from downward movement away from block 70. In the release position, the quick-release member 76 allows withdrawal and/or removal of the u-shape bar 68 from the housing 37. The quick-release member 76 is biased towards the locked position by a pair of biasing elements, which in the illustrated embodiment are compression springs S which act on each of the slotted arms 80a and 80b. To move the quick-release member 76 to the release position, a user simply lifts the quick-release member 76 upwardly away from the pipe 30 such that the slots 82a and 82b are generally perpendicular to arms A of the u-shape bar 68.

It will be appreciated that the quick-release member 76, when in the locked position, is positioned at an incline relative to the u-shape bar 68 such that retraction of the u-shape bar 68 results in binding of the arms of the u-shape bar 68 within the slots 82a and 82b. Because the quick-release member 76 is supported in the housing 37 against further downward pivoting beyond the locked position, the u-shape bar 68 is restricted from withdrawal from the housing 37 due to this binding interference. Thus, as the bolt 72 is rotated to advance the nut/translating member 73 and block member 70 downward, the u-shape bar 68 remains fixed thus allowing the u-shape bar 68 and block member 70 to be securely clamped to the pipe 30.

Release of the attachment mechanism 40 is effected by lifting the quick-release member 76 to a position such that the arms of the u-shape bar 68 extend generally perpendicular to slots 82a and 82b such that no binding action occurs when the u-shape bar member 68 is draw downward and out of the housing 17, thus releasing the water valve shutoff unit 12 from the pipe 30.

It should be appreciated that as the quick-release member 76 is lifted upwardly and the u-shape bar 68 is released (e.g., free for withdrawal from the housing 37) the entire housing 37 can simply be lifted off of the pipe 30 and valve 32 in one swift motion. Accordingly, removal of the water valve shutoff unit 12 from the pipe 30 and valve 32 is intuitive, and can be performed by a person having little or no experience with the unit prior to the need for removal arising.

Drive Unit

Figure 7:
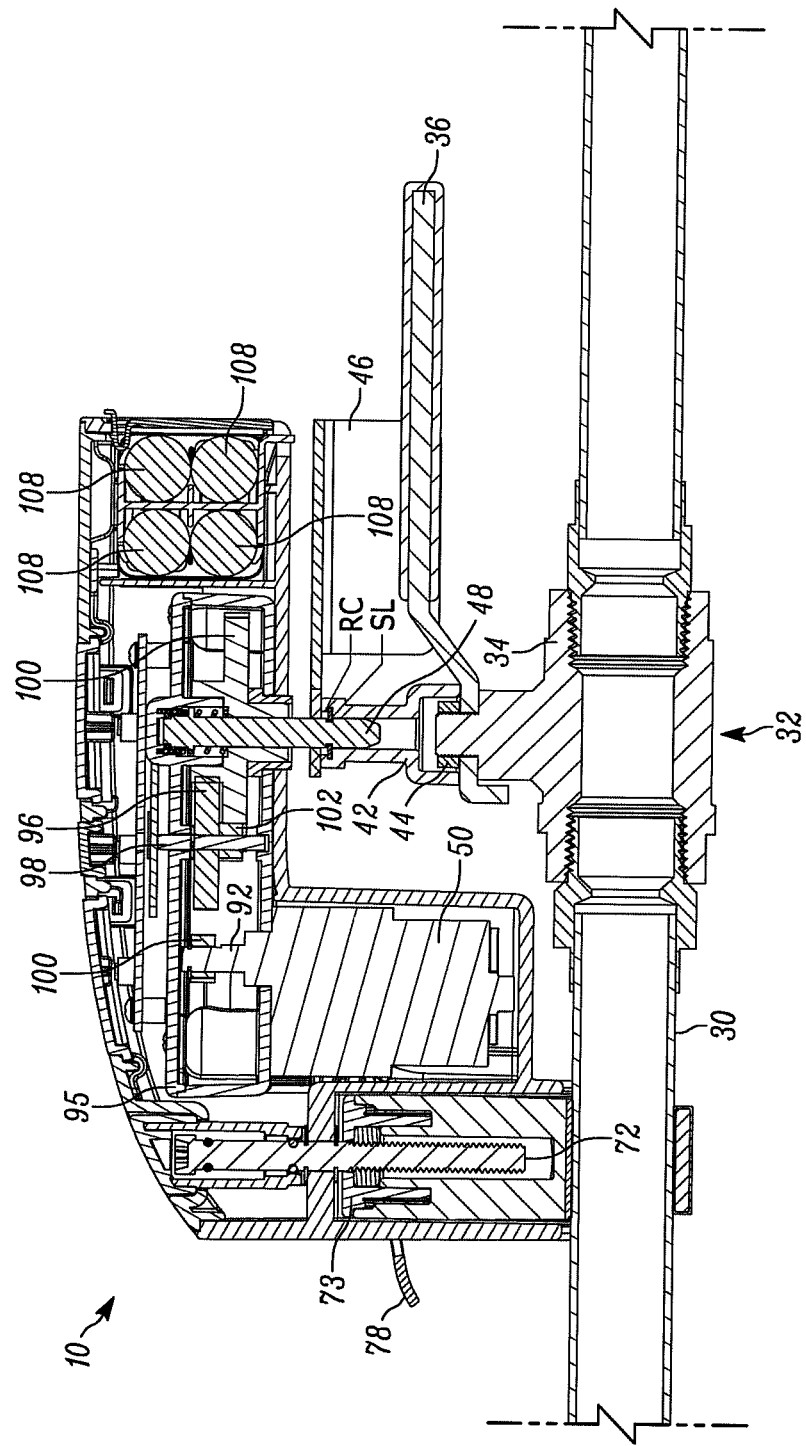
FIG. 7 is a cross-sectional view of the exemplary water valve shutoff unit taken along the line 7-7 in FIG. 6.

Returning to FIG. 5, drive unit 58 generally includes an actuator 50, which in the illustrated embodiment is a DC electric motor, and a power transmission assembly 90 for transmitting the rotational motion of a drive shaft 92 of the actuator 50 to the output shaft 48 for driving handle engagement member 46. In the illustrated embodiment, the power transmission assembly 90 generally includes a subhousing 95 to which the actuator 50 is attached. The subhousing 95 contains the power transmission components rotationally coupling the drive shaft 92 with the output shaft 48. To this end, and as best seen in FIG. 7, an intermediate gear 96 is mounted on a jackshaft 98, which is supported for rotation within the subhousing 95 by bearings or bushings, for example. The intermediate gear 96 is coupled to a gear 100 associated with the drive shaft 92. A second, smaller intermediate gear 102 is mounted to jack shaft 98 and is engaged with output gear 104 mounted to output shaft 48. Output shaft 48 is similarly supported for rotation within subhousing 95 by bearings and/or bushings. The overall gear reduction in the exemplary embodiment can be between, for example, 1000:1 and 3000:1. Of course, any suitable gear reduction can be provided depending on various factors including required torque, motor size, power supply specification, speed of operation, etc.

Output shaft 48 extends to an exterior of the housing 17. Locating member 42 is mounted to the output shaft 48 along with the handle engaging member 46. Locating member 42 is engaged with a base portion of handle 36 and provides additional support to the water valve shut-off unit 12. It will be appreciated that the locating member 42 is configured to align the water valve shut-off unit 12 relative to the valve 32 by positioning the water valve shutoff unit 12 with respect to the handle mounting nut 44 of the shutoff valve 32. The locating member 42, in one embodiment, includes a plurality of replaceable sleeves or inserts that can accommodate a variety of nut sizes and/or configurations (or other fasteners) that are typically used to secure a handle to a valve body.

As best shown in FIG. 7, the locating member 42 rests on handle 36 around the nut 44 and is not rotationally interlocked with either of the handle 36 or the nut 44. Thus, the locating member 42 merely locates the water valve shut-off unit 12 relative to said nut 44 and facilitates positioning of the attachment mechanism 40 relative to the pipe (or other structure) and handle engagement member 46 relative to the valve handle 36. The locating member 42 further restricts lateral and transverse movement of the water valve shutoff unit 12 relative to the pipe 30 once the attachment mechanism 42 is secured to the pipe 30. The water valve shutoff unit 12 thereby resists the torque moment induced during opening/closing of the valve at the point of attachment of the attachment mechanism 40 and at the locating member 42. However, because the locating member 42 is merely telescoped over the mounting nut 44, alignment and installation of the water valve shutoff unit 12 is easily implemented as compared to prior art approaches that use multiple u-bolts or the like for securement.

It will be appreciated that the power transmission assembly can be generally modular and installed into the housing 17 as a unit. This feature can facilitate scaling of the water valve shutoff unit 12 for valves of different sizes and torque operating requirements by allowing the same housing 17 to accommodate a wide range of actuators and/or power transmissions. It should further be appreciated that the power transmission assembly can include other components as desired to achieve a suitable output RPM and torque range depending on the particular application.

Power Supply

In the illustrated embodiment, the power supply 60 includes both an AC power supply and several (e.g., four) batteries 108 supported in a battery carriage 110 that in turn is supported within the housing 17 in a battery compartment 112. A battery compartment cover 114 is removably securable to the housing 17 to enclose the battery compartment. As will be appreciated, the batteries 108 can be conventional batteries of a common size, such as AA, C or D size batteries. The batteries provide backup power for operating the actuator in the case of AC power supply failure due to a power outage or the like. The power supply 60 is electrically coupled to the actuator, user interface and other onboard electronics for supplying power thereto.

User Interface

The user interface 62 generally includes a display portion 120 and one or more user inputs 122, such as buttons. As will be appreciated, the display portion can include one or more indicator lights, an LCD or other graphical display, and/or other components configured to convey information to a user. In addition, one or more audible and/or visual alerts can be provided for alerting a user to the state of the water valve shutoff unit 12. User inputs 122 can include buttons configured to allow a user to input various functions and/or program the unit.

Figure 10:
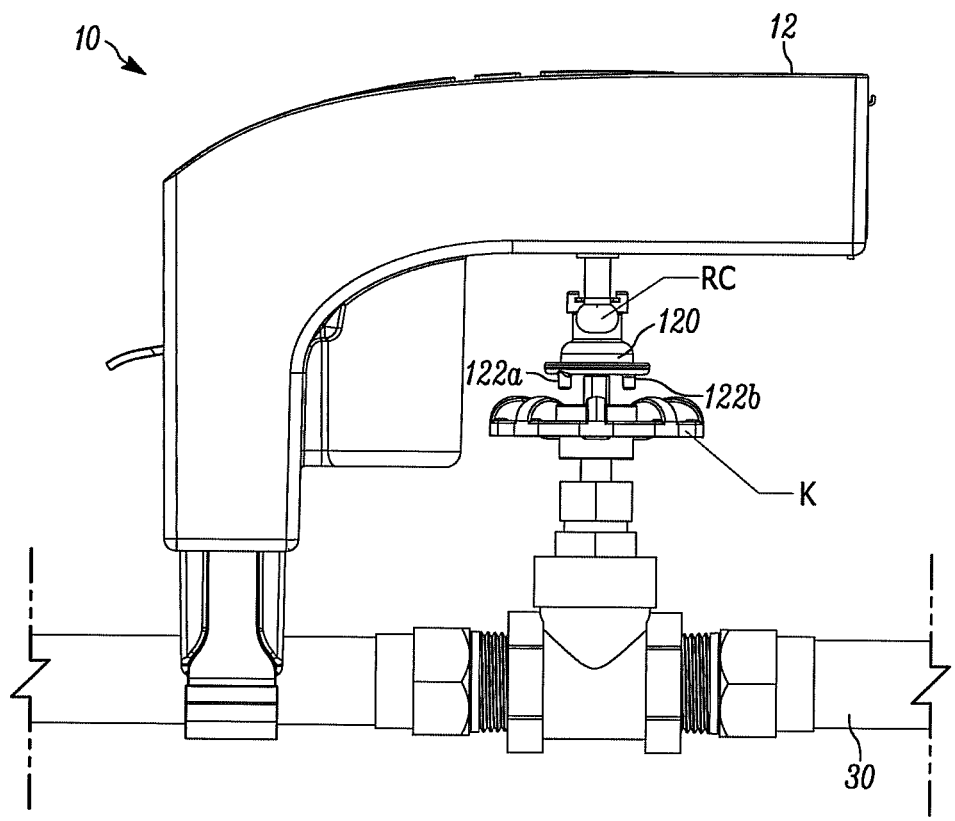
FIG. 10 is a side elevation view of the exemplary water valve shutoff unit of FIG. 2, but with an adapter for engaging a knob of a gate valve.
Figure 11:
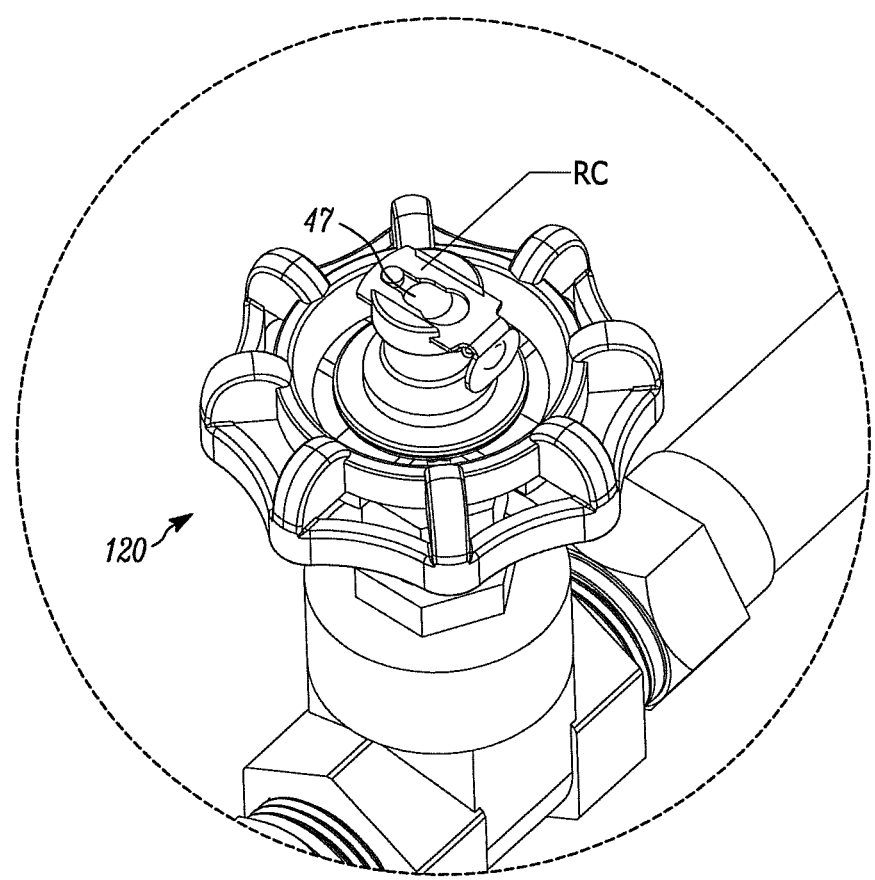
FIG. 11 is a perspective view of the gate valve adapter.

Turning to FIG. 10, an adapter 120 is illustrated that can be used with the unit 12 for allowing the unit to function with a valve having a knob K rather than a handle. Such valves may be either gate valves or ball valves. Some valves, such as gate valves may require a plurality of complete 360 degree rotations of the knob to open/close.

The exemplary adapter 120 is mountable to output shaft 48 is the same manner as the locating member 42 and handle engagement member 46 of the previous embodiment. That is, a retaining clip RC is adapted to selectively engage slot SL in the output shaft to retain the adapter 120 thereon. When secured to the output shaft 48, the adapter 120 is fixed for rotation therewith. The Adapter 120 further includes a pair of pins 122a and 122b configured to extend into openings in the knob K such that rotation of the adapter 120 results in rotation of the knob K. As will be appreciated, the attachment mechanism 40 described above accommodated a range of vertical position of the unit 12 such that the adapter 120 can be positioned with the pins 122a and 122b properly extending into the openings of a variety of valve configurations. That is, a single adapter 120 can be used on in a number of different applications. Of course, adapters of different lengths can be provided for engagement with valve configurations that would fall outside of the adjustment range of the attachment mechanism 40.

It will be appreciated that the systems set forth herein can further be configured to generate and send an alert or notification when one or more of the sensors is triggered and/or one or more of the valve shutoff units are activated, and/or when other parameters are detected or indicated by the a component of the system. Such alerts can include audible alerts, such as an alarm, as well as text and/or email alerts sent to one or more designated recipients, and/or other types of notifications that are part of the Android/iOS platforms (e.g., push notifications, icon badge, etc). Accordingly, the communication interface may include technology for transmitting/receiving a variety of communication protocols including wifi, NFC, Bluetooth, etc. which may be used for transmitting alerts and/or other information regarding the systems.

In one embodiment, an application for a smartphone or other device may be provided for communicating with one or more components of the systems. For example, the application can be configured to access data regarding valve state (open/closed) and/or sensor data (wet/dry, temperature, motion detected etc.) The application can be configured to allow a user to send a "valve close" signal to the actuator to close the shutoff valve whenever desired. The application can be configured to allow a remote user to monitor and interact (e.g., command) the components of the system as if the remote user was not remote from the components.

In some embodiments, the user can set rules for operation of the water valve shutoff unit 12. For example, the user can configure the system to only shutoff the water supply when the user is not known to be present. That is, in cases where the user is home, or otherwise in the immediate vicinity, the system can be configured to first send an alert to the user before activating the shutoff valve 12. User presence can be gleaned from various sources such as proximity or motion detectors in a home, WIFI or Bluetooth connectivity a device associated with the user, etc. In some embodiments, an alert may be sent and, if no action is taken within a prescribed amount of time, the system may then activate the shutoff valve 12 to shutoff the water. The app can include an initialization module to help locate individual sensors and confirm that the sensors are within range of the shutoff valve unit and/or otherwise operating properly. The app can include an event log for tracking and timestamping system events such as, open/close of valve, leak detection, connectivity alerts, etc. The app can also be used to toggle individual sensors between various modes. For example, it may be desirable to place one or more sensors in a detection only mode wherein the sensor is configured to detect water and generate an alert, but no action is taken by the shutoff valve in response to the detected presence of water. This can be useful for sensors that are configured to detect water leaks from sources of water other than the household plumbing, such as HVAC condensation drain lines or pans, sump pumps, for example.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An automatic valve actuator unit for use with an associated manual shutoff valve configured to permit or restrict the flow of fluid through an associated supply pipe, the unit comprising:
   a housing;
   an attachment mechanism for securing the housing to at least one of the associated supply pipe or manual shutoff valve; and
   an actuator at least partially supported by the housing for actuating the associated shutoff valve;
   wherein the attachment mechanism includes a clamp assembly having first and second cooperating clamp members, the first and second cooperating clamp members being movable within the housing to adjust a point of attachment of the housing;
   wherein the first clamp member includes a clamp block supported for sliding movement within the housing between an upper and lower position, and wherein the second clamp member includes a removable u-shape clamp;
   the attachment mechanism including an adjustment member for adjusting the position of the clamp block within the housing, the adjustment member operative to move the clamp block between the upper and the lower positions; and
   wherein the adjustment member includes a lead screw including a threaded shaft with a non-circular cross-sectional portion, and a handle member including a tubular portion telescoped over the threaded shaft, the tubular portion including a non-circular cross-sectional portion corresponding in shape to the non-circular cross-sectional portion of the shaft, the handle member being slidable axially along the threaded shaft between a first position whereat the non-circular cross-sections are not axially aligned and the threaded shaft and handle member are not rotationally interlocked, to a second position whereat the non-circular cross-sections are at least partially aligned thereby rotationally interlocking the handle member and the threaded shaft for actuation of the lead screw.

2. The automatic valve actuator unit of claim 1, wherein an output shaft of the actuator includes a locating member supported at a distal end thereof for non-rotatingly engaging a surface of a valve handle of the associated manual shutoff valve adjacent a point of attachment of the handle to the associated manual shutoff valve, the locating member configured to center the output shaft over an axis of rotation of the handle of the associated manual shutoff valve.

3. The automatic valve actuator unit of claim 2, further comprising a handle engaging member fixed to the output shaft for rotation therewith, the handle engaging member having a u-shape cross-section for engaging opposite sides of a handle of the associated manual shutoff valve.

4. The automatic valve actuator unit of claim 3, wherein the handle engaging member extends radially from the output shaft and is configured to engage the handle of the associated manual shutoff valve at a location spaced from an axis of rotation of the handle.

5. The automatic valve actuator unit of claim 1, further comprising a quick-release member movable between a locked and unlocked position for permitting or restricting withdrawal of the u-shape clamp from the housing.

6. The automatic valve actuator unit of claim 1, wherein the actuator includes a battery-powered electric motor operably connected to the output shaft via a gear train, the battery-powered electric motor being supported by the housing at a position between the attachment mechanism and the output shaft.

7. A system comprising at least one sensor configured to detect the presence of water and the automatic valve actuator unit as set forth in claim 1, wherein the sensor is configured to transmit a signal to the automatic valve actuator unit to close the associated manual shutoff valve when water is detected.

8. An attachment mechanism for securing an automatic valve actuator unit to a pipe or other structure in proximity to a manual valve actuator comprising:
   a clamp assembly having first and second cooperating clamp members, the first and second cooperating clamp members being movable within a housing of the automatic valve actuator unit to adjust a point of attachment of the housing;
   wherein the first clamp member includes a clamp block supported for sliding movement within the housing between an upper and lower position, and wherein the second clamp member includes a removable u-shape clamp;
   the attachment mechanism including an adjustment member for adjusting the position of the clamp block within the housing, the adjustment member operative to move the clamp block between the upper and the lower positions; and
   wherein the adjustment member includes a lead screw including a threaded shaft with a non-circular cross-sectional portion, and a handle member including a tubular portion telescoped over the threaded shaft, the tubular portion including a non-circular cross-sectional portion corresponding in shape to the non-circular cross-sectional portion of the shaft, the handle member being slidable axially along the threaded shaft between a first position whereat the non-circular cross-sections are not axially aligned and the threaded shaft and handle member are not rotationally interlocked, to a second position whereat the non-circular cross-sections are at least partially aligned thereby rotationally interlocking the handle member and the threaded shaft for actuation of the lead screw.

9. The attachment mechanism of claim 8, further comprising a quick-release member movable between a locked and unlocked position for permitting or restricting withdrawal and separation of the u-shape clamp from the housing.

10. The attachment mechanism of claim 9, wherein the quick-release member includes a pair of slotted arms each having a slot through which respective arms of the u-shape clamp extend when the u-shape bar is within the housing.

11. The attachment mechanism of claim 10, wherein the quick-release member is supported by the housing for pivoting movement between the locked and unlocked position.

12. The attachment mechanism of claim 11, wherein the quick-release mechanism is biased towards the locked position by at least one biasing element.

13. The attachment mechanism of claim 11, wherein the quick-release mechanism is movable from the unlocked position whereat the slots in the slotted arms are perpendicular to the respective arms of the u-shape clamp to the locked position whereat the slots in the slotted arms are at an acute angle with respect to the arms of the u-shape clamp.

14. A method of converting a manual shutoff valve to an automatic shutoff valve comprising:
   providing an automatic valve actuator unit including:
      a housing;
      an attachment mechanism for securing the housing to at least one of the associated supply pipe or manual shutoff valve; and
      an actuator at least partially supported in the housing and having an output shaft extending from the housing;
      wherein the attachment mechanism includes a clamp assembly having first and second cooperating clamp members, the first and second cooperating clamp members being movable within the housing to adjust a point of attachment of the housing;
      wherein the first clamp member includes a clamp block supported for sliding movement within the housing between an upper and lower position, and wherein the second clamp member includes a removable u-shape clamp;
      the attachment mechanism including an adjustment member for adjusting the position of the clamp block within the housing, the adjustment member operative to move the clamp block between the upper and the lower positions; and
      wherein the adjustment member includes a lead screw including a threaded shaft with a non-circular cross-sectional portion, and a handle member including a tubular portion telescoped over the threaded shaft, the tubular portion including a non-circular cross-sectional portion corresponding in shape to the non-circular cross-sectional portion of the shaft, the handle member being slidable axially along the threaded shaft between a first position whereat the non-circular cross-sections are not axially aligned and the threaded shaft and handle member are not rotationally interlocked, to a second position whereat the non-circular cross-sections are at least partially aligned thereby rotationally interlocking the handle member and the threaded shaft for actuation of the lead screw;
   positioning the automatic valve actuator unit over the manual shutoff valve;
   securing the automatic valve actuator unit to the manual shutoff valve or other adjacent structure with the attachment mechanism; and
   coupling the output shaft of the actuator to an actuator of the manual shutoff valve.

15. The method of claim 14, wherein the securing further includes positioning the first clamp member on a first side of the manual shutoff valve or adjacent structure, inserting the second clamp member into the housing from an opposite side of the manual shutoff valve or adjacent structure such that the manual valve member or other adjacent structure is trapped between the first and second clamp members, and clamping the manual shutoff valve or other adjacent structure therebetween by drawing the first and second clamp members together with the adjustment member.

16. The method of claim 15, wherein the quick-release member is maintained in the unlocked position until the second clamp member is fully inserted into the housing.

17. The method of claim 15, wherein the quick-release member is maintained in the locked position when the adjustment member is used to draw the first and second clamp members together.

* * * * *